United States Patent Office 2,966,463
Patented Dec. 27, 1960

2,966,463
CALCIUM SILICATE PHOSPHOR

Francis N. Shaffer and Richard W. Mooney, Towanda, Pa., assignors to Sylvania Electric Products Inc., a corporation of Delaware No Drawing. Filed Mar. 11, 1959, Ser. No. 798,603

6 Claims. (Cl. 252—301.4)

This invention relates to phosphors, that is to substances which, on absorption of one type or wavelength of radiation, emit another type or wavelength. In particular, the invention relates to calcium silicate phosphors.

Calcium silicate phosphors activated by lead are well known, but emit radiation in the ultraviolet region. When excited by radiation of about 2500 Angstrom units, they emit radiation of about 2900–3900 Angstrom units. Both the exciting and emitting radiation is in the ultraviolet region, and so no visible light is produced.

If manganese is added to the lead-activated calcium silicate as a second activator, visible emission in the orange or red region is emitted, but some ultraviolet radiation is also emitted, and can be undesirable in a fluorescent lamp intended for general illumination purposes. The efficiency of visible emission is reduced because some of the exciting energy goes into the production of the invisible ultraviolet radiation.

We have discovered that if tin is used as the activator instead of lead, visible light in the blue or green regions will be emitted without the accompaniment of any appreciable ultraviolet light, and without the necessity of a second activator such as manganese, although the latter can be added in some cases if desired. When manganese is used as a second activator, the color instead of being blue-green, will be white or red, depending on the amount of manganese present.

The color of the tin-activated phosphor can therefore be made any desired color by adjusting the amount of manganese present. With the lead-activated phosphor, such color control was not available, the emission color being always an orange-red when appreciable manganese was present, and no visible light at all being present without the manganese.

We have found that not all calcium silicates activated by tin, with or without manganese, are fluorescent. We have, in fact, found that the tin activator must be at least partly in the stannous, as distinguished from the stannic state, and that the calcium silicate itself must be of a particular type. The alpha-form of calcium silicate has relatively low fluorescent emission, but the beta-form has very good emission as a phosphor, and can be excited by either ultraviolet radiation or cathode rays.

We have found that fluorescence will be obtained from either the meta-silicate or orthosilicate if the material is of the beta-type, but that the fluorescence of the orthosilicate is far superior in most respects to that of the other.

For example, while the metasilicate, activated by tin alone, is considerably below self-activated magnesium tungstate in blue emission, the orthosilicate, activated by tin alone, is well above magnesium tungstate in blue emission. The orthosilicate, however, cannot be activated by tin and manganese together, because the manganese tends to stabilize the material in the metasilicate form; the metasilicate can be activated by tin and manganese together, thereby gaining a broader distribution of its emission throughout the spectrum, whereas the orthosilicate emits only in the blue portion of the spectrum.

The orthosilicate, moreover, is an effective emitter even at temperatures of 300° C., and so can be used as a coating on the inner surface of the outer bulb of a high pressure mercury lamp. At this temperature, other blue phosphors, such as lead-activated calcium magnesium tungstate, and self-activated magnesium tungstate, are completely "dead" giving no emission at all, and even tin-activated strontium pyrophosphate gives only about one-third of its normal emission.

In order to insure that the tin is in the stannous state, a slightly reducing atmosphere is used during firing. Hydrogen, carbon monoxide, water, gas or other reducing atmospheres can be used. The presence of steam in the atmosphere is essential to the production of an efficient phosphor, although the amount used is not critical. Nitrogen can be added to prevent over-reduction of the tin to the metallic state, but does not appear to be generally necessary.

Other objects, features and advantages of the invention will be apparent from the following specification, in which the metasilicate, $CaSiO_3$, is described first and then the orthosilicate, $Ca_2SiO_4$, with further specific examples of each being given afterward.

BETA-$CaSiO_3$:Sn AND BETA-$CaSiO_3$:Sn+Mn

Calcium carbonate and silicic acid are weighed out in amounts corresponding to a mole ratio of 1.00 $CaCO_3$ to 1.00–1.50 $SiO_2$—the exact amount dependent upon the activator concentration, but always maintaining a slight excess of $SiO_2$ in order to insure the formation of the meta-silicate rather than the orthosilicate. Other calcium compounds could also be used such as calcium oxalate or calcium dihydrogen orthosilicate ($CaH_2SiO_4$) in which case the amount of silica would have to be reduced to compensate for that contained in the $CaH_2SiO_4$. The tin activator may be introduced as the stannic oxide ($SnO_2$) or the stannous oxide (SnO) although the latter is to be preferred on account of its greater reactivity. The activator concentration may vary anywhere from 0.01 to 20 mol percent, but best results are obtained between 0.05 and 8 mole percent Sn.

The mixture of a calcium salt, a tin oxide and silicic acid is mixed by pebble milling in deionized water for approximately two hours followed by filtering and drying. The dry filter cake is broken up by some suitable means such as rolling, ball milling, or hammermilling, and if desired, mixed with a flux such as $NH_4Cl$ prior to firing. The mix is then placed in boats or crucibles and fired in a mixture of steam, hydrogen, and nitrogen at temperatures ranging from 1900 to 2200° F. with the most efficient phosphors being produced between 2000 and 2100° F. Excessively high temperatures must be avoided since at 2175° F., $\beta$-$CaSiO_3$ converts into $\alpha$-$CaSiO_3$ which is only weakly luminescent when activated by tin. The firing times may vary from one hour to as much as 24 hours.

The finished phosphor emits in the blue-green with a very long decay time when excited by 2537 A. ultraviolet or cathode rays and less efficiently when excited by 3650 A. radiation.

Introduction of manganese as a secondary activator into the tin-activated calcium metasilicate shifts the emission color under 2537 A. excitation from blue-green to white on to red as the ratio of manganese is increased. The preparation procedure is approximately the same as that outlined for the beta-calcium metasilicate activated by tin only, that is, the calcium salt, tin oxide, and silicic acid are weighed out together with a manganese salt such as manganous carbonate, manganous metasilicate or manganous oxalate, and this mixture is pebble milled in deionized water as described above. Firing temperatures are approximately the same although the introduction of manganese into this system causes the transition temperature from the beta to the alpha form of calcium metasilicate to be increased with the net result that the beta-calcium metasilicate structure is stabilized at the higher firing temperatures. Therefore, it is possible to use higher firing temperatures with the tin and manganese activated phosphor than it is with the tin only activated phosphor. However, optimum results are still obtained in the neighborhood of 2000–2100° F.

As an example of the effect of the variations of manganese content, the following table lists relative readings obtained on a Zeiss Pulferich photometer under 2537 A. excitation at the manganese contents listed.

Table I

| Mols Mn | Red | Green | Blue |
|---|---|---|---|
| 0.00 | 24 | 232 | 312 |
| 0.01 | 42 | 213 | 208 |
| 0.02 | 80 | 200 | 182 |
| 0.03 | 82 | 154 | 133 |
| 0.05 | 100 | 100 | 100 |
| 0.0665 | 119 | 82 | 100 |
| 0.08 | 122 | 78 | 100 |
| 0.10 | 127 | 68 | 100 |

This particular test was run at a calcium to silica ratio of 1.00 to 1.20 with 0.05 gram atoms of tin per gram mole of calcium metasilicate. As described above, the slight excess of silicic acid is used to force the reaction to completion and to avoid the formation of any calcium orthosilicate. It is obvious from Table I that the introduction of manganese increases the red emission while decreasing the blue emission due to tin alone.

The sample activated by tin alone is not as efficient in emission as magnesium tungstate, especially in the blue region, but it has other properties which make it unique: namely, a very long decay time and excellent temperature stability. In fact, the phosphor gives at least 50% of its room-temperature emission even at 340° C., whereas, magnesium tungstate, a standard blue phosphor, drops to 50% emission at about 150° C. The temperature stability of the phosphor of the present invention is good even when manganese is added.

BETA-$Ca_2SiO_4$:Sn

As the ratio of calcium to silica is increased beyond 1 to 1 the formation of $\beta$-$Ca_2SiO_4$ is observed by X-ray diffraction. Similarly, the emission color begins to shift towards a deep blue while the decay time is reduced. Optimum results are obtained close to the 2 to 1 ratio of calcium to silica necessary for the orthosilicate formation.

More specifically, the preparation procedure is as follows: Calcium carbonate and silicic acid are weighed out in amounts corresponding to a mole ratio of 2.00 $CaCO_3$ to 1.00 to 1.50 $SiO_2$, the exact amount dependent upon the activator concentration, but always maintaining a slight excess of $SiO_2$ in order to insure the formation of the orthosilicate and to prevent the formation of any free calcium oxide. As before, other calcium compounds could also be used such as calcium oxalate or calcium dihydrogen orthosilicate ($CaH_2SiO_4$) in which case the amount of silica would have to be reduced to compensate for that contained in the $CaH_2SiO_4$. The tin activator would be introduced as the stannic oxide ($SnO_2$) or the stannous oxide (SnO) although the latter is preferred on account of its greater reactivity. The activator concentration may vary anywhere from 0.1 to 20 mole percent, but the best results are obtained between 1–10 mole percent tin.

The mixture of a calcium salt, a tin oxide, and silicic acid is mixed by pebble milling in deionized water for approximately 2 hrs., followed by filtering and drying. The dry filter cake is broken up by some suitable means such as rolling, ball milling, or hammermilling and, if desired, mixed with a flux such as $NH_4Cl$ prior to firing.

The method of firing is approximately the same as that related previously, with the exception of the firing temperature used to obtain the desired crystal structure. The ingredients are fired in an atmosphere of steam, a reducing gas such as hydrogen, and nitrogen. When hydrogen is used, a 1 to 1 mole ratio of hydrogen to nitrogen gives the best results although the ratio of nitrogen to hydrogen may vary widely. The firing temperatures employed may vary over a very wide range, since $\beta$-$Ca_2SiO_4$ is not transformed into a higher temperature form except at temperatures greater than 2280° F. When the calcium to silica ratio is exactly 2 to 1, there is evidence that above this temperature there is some formation of the compound $\alpha$-$Ca_2SiO_4$ resulting in a decrease in the deep blue emission due to $\beta$-$Ca_2SiO_4$. At lower calcium to silica ratios, namely, at percent silicas greater than 34.8%, even higher firing temperatures are possible (greater than 2400° F.) before any phase transition occurs. Thus the firing temperature may vary from 1900 to 2300° F. although optimum results are obtained between 2100–2250° F.

The finished phosphor emits in the deep blue when excited by either 2537 A. or near ultraviolet, i.e., 3650 A. and, therefore, it also emits strongly in the deep blue when excited by the wavelengths present in the high pressure mercury vapor arc. It is also efficiently excited by cathode rays, giving deep blue emission. As contrasted to the $\beta$-$CaSiO_3$:Sn it has essentially zero decay time. The temperature stability of this phosphor is also excellent, maintaining 50% of its room temperature efficiency up to temperatures greater than 350° C.

This phosphor is very sensitive in the amount of excess silicate as evidenced by the data given in Table II, in which the quantity of $SiO_2$ is given per 2.00 moles of $CaCO_3$ in the starting mixture, and the tin content is 0.05 moles on the same basis.

Table II

EFFECT OF $SiO_2$ CONTENT

| Moles, $SiO_2$: | Blue plaque |
|---|---|
| 0.98 | Dead |
| 0.99 | 66 |
| 1.00 | 74 |
| 1.01 | 101 |
| 1.03 | 107 |
| 1.05 | 115 |
| 1.10 | 102 |
| 1.20 | 96 |
| 1.50 | 63 |
| 2.00 | Dead |

Optimum results are obtained at a Ca to Si ratio of 2.00 to 1.05.

It is evident from this data that the efficiency falls off sharply once the calcium to silica ratio of 2 to 1 is exceeded due to the formation of free calcium oxide. The compound may be formed at any of the calcium to silica ratios mentioned above, although optimum results are obtained at a calcium to silica ratio varying from 2.00 to 1.00 to 2.00 to 1.20.

Similarly, the activator concentration may vary widely although the most efficient results are produced over a rather narrow range. The data given in Table III is an indication of the effect of the activator concentration on the efficiency of this phosphor. The tin oxide content is given in moles per 2.00 moles $CaCO_3$, as before, with 1.05 moles $SiO_2$.

Table III

EFFECT OF Sn CONTENT

| Moles SnO: | Blue plaque brightness |
|---|---|
| 0.01 | 114 |
| 0.03 | 118 |
| 0.05 | 115 |
| 0.075 | 109 |
| 0.10 | 109 |

The color of this phosphor is very similar to calcium-magnesium-lead tungstate.

Table IV
COMPARISON OF BLUE PHOSPHORS TO 2537 A. RADIATION

| Phosphor: | Plaque reading blue |
|---|---|
| Calcium magnesium tungstate:Pb | 93 |
| β-Calcium orthosilicate:Sn | 118 |
| Magnesium tungstate | 95 |

It may be seen that $\beta$-$Ca_2SiO_4$:Sn has greater blue emission than any of these phosphors. Its green emission is greater than that of calcium magnesium tungstate:Pb. Of course, magnesium tungstate has the highest green emission being a blue-green phosphor.

The same phosphors respond to the wavelengths present in the high pressure mercury vapor arc as listed in Table V. Relative readings are also given at 300° C. The abbreviation "HPMV" is used for "high pressure mercury vapor."

Table V
COMPARISON OF BLUE PHOSPHORS TO HPMV RADIATION

| Phosphor | Blue Plaque Reading | |
|---|---|---|
| | Room Temperature | 300° C. |
| Calcium Magnesium Tungstate:Pb | 280 | Dead |
| β-Calcium Orthosilicate:Sn | 550 | 390 |
| Magnesium Tungstate | 500 | Dead |

At room temperature, $\beta$-$Ca_2SiO_4$:Sn is slightly more efficient than magnesium tungstate while at 300° C. it is the only one of the above phosphors which is still relatively efficient.

Manganese could not be introduced as a secondary activator in $\beta$-$Ca_2SiO_4$:Sn since, as related previously, the introduction of Mn tends to stabilize the $\beta$-$CaSiO_3$ structure.

Particular examples of the preparation of these phosphors are described below.

EXAMPLE 1

The following materials in finely-powdered form were weighed out into a one-quart pebble-mill.

| | Mole Ratio | Weight, Grams |
|---|---|---|
| $CaCO_3$ | 1.00 | 100 |
| $SiO_2 \cdot xH_2O$ (90% $SiO_2$) | 1.20 | 80 |
| $SnO_2$ | 0.05 | 7.5 |

Five hundred (500) mls. of deionized water were added and the mixture was rolled for 2 hours. At the end of this period, the slurry was filtered on a Buchner funnel and oven-dried at 110° C. for 16 hours. Portions of the dried filter cake were fired 5 hours at 2050° F. in an atmosphere of 6 liters per minute flow of steam and 2 liters per minute flow of hydrogen. The material was cooled to room temperature in nitrogen.

EXAMPLE 2

The following materials in finely-powdered form were weighed out into a quart pebble-mill.

| | Mole Ratio | Weight, Grams |
|---|---|---|
| $CaCO_3$ | 1.00 | 100 |
| $SiO_2 \cdot xH_2O$ (90% $SiO_2$) | 1.20 | 80 |
| $SnO_2$ | 0.05 | 7.5 |
| $MnCO_3$ (44% Mn) | 0.05 | 6.25 |

Five hundred (500) mls. of deionized water were added and the mixture was rolled for 2 hours. The slurry was filtered on a Buchner funnel and oven-dried at 110° C. for 16 hours. After cooling, the dried filter cake was hammermilled and fired 5 hours at 2050° F. in an atmosphere of 6 liters per minute flow of steam and 2 liters per minute flow of hydrogen. The phosphor was cooled to room temperature in nitrogen.

EXAMPLE 3

The following materials in finely-powdered form were weighed out into a one-quart pebble-mill.

| | Mole Ratio | Weight, Grams |
|---|---|---|
| $CaCO_3$ | 1.00 | 100 |
| $SiO_2 \cdot xH_2O$ (90% $SiO_2$) | 1.20 | 80 |
| $SnO$ | 0.05 | 6.74 |
| $MnCO_3$ (44% Mn) | 0.0665 | 8.30 |

Five hundred (500) mls. of deionized water were added and the mixture was rolled for 2 hours. The resulting slurry was filtered on a Buchner funnel and oven-dried at 110° C. for 16 hours. Portions of the dried filter cake were fired 5 hours at 2050° F. in an atmosphere of 6 liters per minute flow of steam and 2 liters per minute flow of hydrogen. The phosphor was cooled to room temperature in nitrogen.

EXAMPLE 4

The following materials in finely-powdered form were weighed out into a 2-gallon pebble-mill.

| | Mole Ratio | Weight, Grams |
|---|---|---|
| $CaCO_3$ | 2.00 | 600.6 |
| $SiO_2 \cdot xH_2O$ (84.2% $SiO_2$) | 1.05 | 224.7 |
| $SnO$ | 0.03 | 12.1 |

Fifteen hundred (1500) mls. of deionized water were added and the mixture was milled for 2 hours. The resulting slurry was filtered on a Buchner funnel and oven-dried at 110° C. for 16 hours. The cooled filter cake was rolled out and 0.05 mole $NH_4Cl$ (8.1 g. $NH_4Cl$) were mixed by blending. The powder mixture was then fired in an atmosphere of steam (20 lbs. pressure at a steam valve setting of 0.2), 5 liters per minute of hydrogen, and .5 liters per minute of nitrogen for 3 hours at 2200° F. The resulting phosphor was cooled to room temperature in nitrogen.

What we claim is:
1. A phosphor of beta calcium metasilicate activated by stannous tin.
2. A phosphor of beta calcium metasilicate activated by stannous tin and manganese.
3. A beta calcium metasilicate phosphor activated by stannous tin, in which the mole ratio of calcium to silicon is between about 1.00/1.00 and about 1.00/1.50 and in which the tin content is between about 0.0001 gram-atoms to 0.1 gram-atoms per mole of silicon dioxide.
4. A phosphor of beta calcium orthosilicate activated by stannous tin.
5. A phosphor of beta calcium orthosilicate activated by stannous tin, in which the mole ratio of Ca to Si is between 2.00 to 1.00 and 2.00 to 1.20.
6. A phosphor of beta calcium orthosilicate activated by stannous tin, in which the mole ratio of Ca to Si is between 2.00 to 1.00 and 2.00 to 1.20, and in which the tin content is between about 0.0001 gram-atoms and 0.15 gram-atoms per mole of silicon dioxide.

References Cited in the file of this patent

UNITED STATES PATENTS

| 2,457,054 | Leverenz | Dec. 21, 1948 |
| 2,525,028 | Froelich | Oct. 10, 1950 |

FOREIGN PATENTS

| 572,771 | Great Britain | Oct. 23, 1945 |

OTHER REFERENCES

Kroger: "Some Aspects of Luminescence of Solids," Elsevier Pub. Co. (1948), page 279.